United States Patent
Sisbot et al.

(10) Patent No.: US 12,492,909 B2
(45) Date of Patent: Dec. 9, 2025

(54) PARKING ASSIST SYSTEM

(71) Applicant: Toyota Motor Engineering & Manufacturing North America, Inc., Plano, TX (US)

(72) Inventors: Emrah Akin Sisbot, Menlo Park, CA (US); Seyhan Ucar, Mountain View, CA (US); Takamasa Higuchi, Mountain View, CA (US); Yongkang Liu, Mountain View, CA (US); Kentaro Oguchi, Mountain View, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 316 days.

(21) Appl. No.: 17/957,145

(22) Filed: Sep. 30, 2022

(65) Prior Publication Data

US 2024/0110805 A1  Apr. 4, 2024

(51) Int. Cl.
G01C 21/34 (2006.01)
G01C 21/00 (2006.01)
G08G 1/14 (2006.01)

(52) U.S. Cl.
CPC ..... *G01C 21/3476* (2013.01); *G01C 21/3807* (2020.08); *G01C 21/3833* (2020.08); *G08G 1/143* (2013.01)

(58) Field of Classification Search
None
See application file for complete search history.

(56) References Cited

U.S. PATENT DOCUMENTS

| | | |
|---|---|---|
| 10,717,432 B2 | 7/2020 | Krekel et al. |
| 10,821,972 B2 | 11/2020 | Krekel et al. |
| 2018/0059679 A1* | 3/2018 | Taimouri ............... G06N 3/08 |
| 2018/0208244 A1* | 7/2018 | Nakayama ......... B62D 15/0285 |
| 2018/0362082 A1 | 12/2018 | Anderson et al. |
| 2019/0333229 A1 | 10/2019 | Dane et al. |
| 2020/0089973 A1* | 3/2020 | Efland ................... G05D 1/247 |
| 2020/0104612 A1 | 4/2020 | Chen et al. |

(Continued)

FOREIGN PATENT DOCUMENTS

JP  2018127154  *  3/2020

*Primary Examiner* — Christian Chace
*Assistant Examiner* — Ai K Tran
(74) *Attorney, Agent, or Firm* — Christopher G. Darrow; Darrow Mustafa PC

(57) ABSTRACT

A parking assist system for a vehicle includes a processor and a memory communicably coupled to the processor. The memory stores instructions that when executed by the processor cause the processor to detect a parking space for a vehicle. The instructions further cause the processor to identify one or more parking parameters related to parking the vehicle in the parking space. The parking parameters include a point-of-interest associated with the parking space. The instructions further cause the processor to determine a suitability of the parking space based on the one or more parking parameters. Determining the suitability of the parking space includes predicting a point-of-interest-related action to be performed by an occupant after parking the vehicle in the parking space.

17 Claims, 9 Drawing Sheets

(56) References Cited

U.S. PATENT DOCUMENTS

| | | | |
|---|---|---|---|
| 2022/0118916 A1 | 4/2022 | Kang | |
| 2023/0398868 A1* | 12/2023 | Park | G01C 21/3647 |
| 2024/0067194 A1* | 2/2024 | Slattery | B60W 50/06 |

* cited by examiner

PARKING ASSIST SYSTEM

TECHNICAL FIELD

The embodiments disclosed herein relate to a parking assist system for a vehicle and, more particularly, to a parking assist system for a vehicle based on a point-of-interest.

BACKGROUND

Some vehicles include parking assist systems having one or more distance sensors, for example, LIDAR, RADAR, or SONAR sensors, mounted to the vehicle, as well as one or more cameras, for example, back-up cameras, mounted to the vehicle. These parking assist systems can detect an object near the vehicle and the distance from the vehicle to the object, as well as show an occupant of the vehicle a live view of a portion of the external environment of the vehicle. While such parking assist systems may be helpful to the occupant during parking, the occupant may still have difficulty ascertaining whether the vehicle will fit into a parking space, how the vehicle will fit into the parking space, and, once the vehicle is parked, whether the occupant can safely open the vehicle doors and exit the vehicle without hitting a curb, another car, or other obstacles.

SUMMARY

Disclosed herein are embodiments of a parking assist system for a vehicle.

In one aspect, a parking assist system is disclosed. The parking assist system includes a processor and a memory communicably coupled to the processor. The memory stores instructions that when executed by the processor cause the processor to detect a parking space for a vehicle. The instructions further cause the processor to identify one or more parking parameters related to parking the vehicle in the parking space. The parking parameters include a point-of-interest associated with the parking space. The instructions further cause the processor to determine a suitability of the parking space based on the one or more parking parameters. Determining the suitability of the parking space includes predicting a point-of-interest-related action to be performed by an occupant after parking the vehicle in the parking space.

In another aspect, a method of operating a parking assist system is disclosed. The method includes detecting a parking space for a vehicle. The method further includes identifying one or more parking parameters related to parking the vehicle in the parking space. The parking parameters include a point-of-interest associated with the parking space. The method further includes determining a suitability of the parking space based on the one or more parking parameters. Determining the suitability of the parking space includes predicting a point-of-interest-related action to be performed by an occupant after parking the vehicle in the parking space.

In yet another aspect, a non-transitory computer-readable medium is disclosed. The non-transitory computer-readable medium includes instructions that, when executed by a processor, cause the processor to detect a parking space for a vehicle. The instructions further cause the processor to identify one or more parking parameters related to parking the vehicle in the parking space. The parking parameters include a point-of-interest associated with the parking space. The instructions further cause the processor to determine a suitability of the parking space based on the one or more parking parameters. Determining the suitability of the parking space includes predicting a point-of-interest-related action to be performed by an occupant after parking the vehicle in the parking space.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches a parking assist system for a vehicle. The parking assist system is configured to detect a parking space for a vehicle and determine whether the parking space is suitable for parking the vehicle. The parking assist system may identify one or more parking parameters related to parking the vehicle in the parking space. The parking parameters can include one or more vehicle parameters, one or more environmental parameters, one or more occupant parameters, and open or more point-of-interest-related parameters, including a point-of-interest associated with the parking space and/or one or more point-of-interest-related objects. The parking assist system can determine a suitability of the parking space based on the parking parameters. Determining the suitability of the parking space includes predicting a point-of-interest-related action to be performed by an occupant after parking the vehicle in the parking space.

Figure 1:
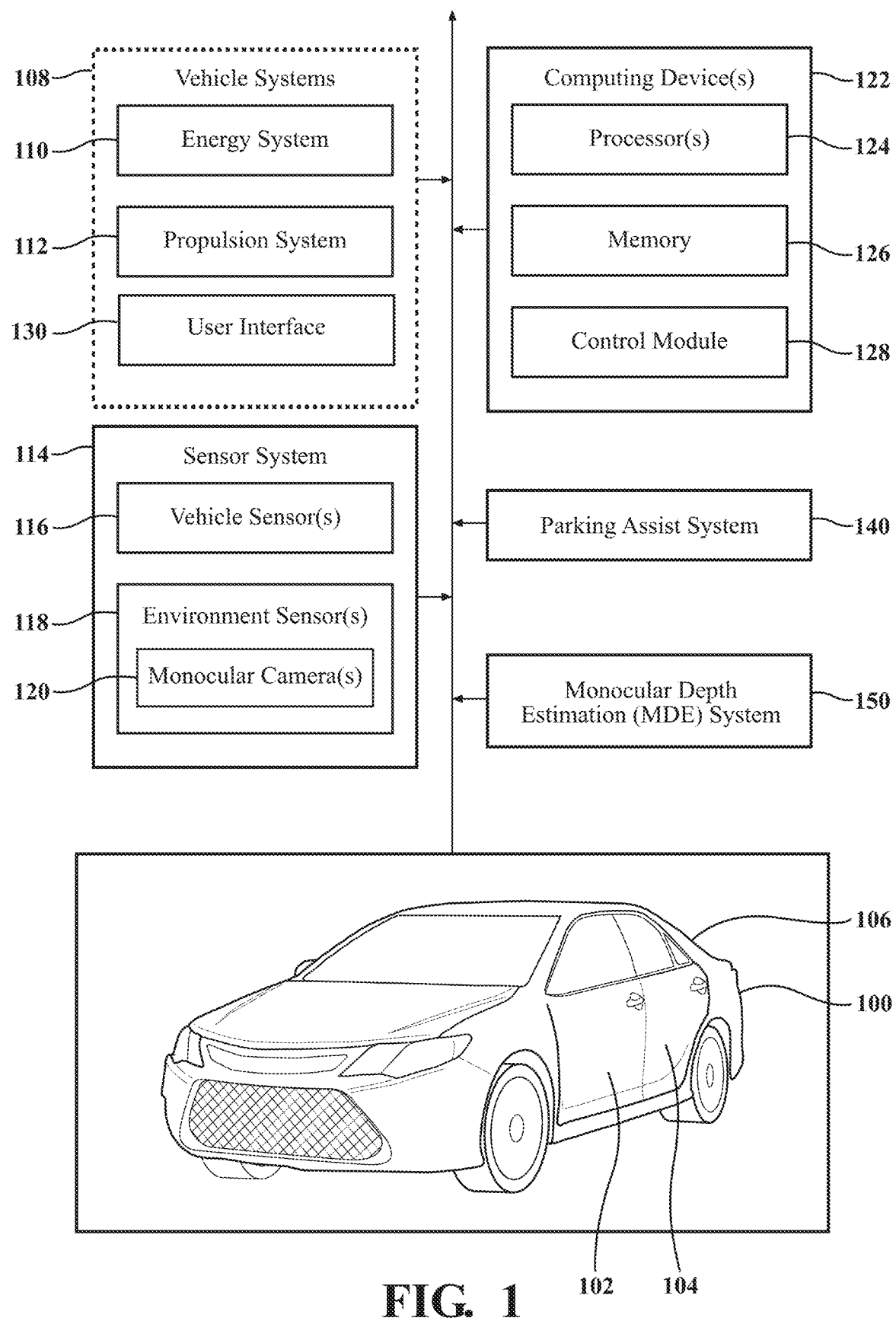
FIG. 1 is an example of a vehicle including a parking assist system.

A representative passenger vehicle 100 is shown in FIG. 1. In this description, uses of "front," "forward" and the like, and uses of "rear," "rearward" and the like, refer to the longitudinal directions of the vehicle 100. "Front," "forward," and the like refer to the front (fore) of the vehicle 100, while "rear," "rearward" and the like refer to the back (aft) of the vehicle 100. Uses of "side," "sideways," "transverse" and the like refer to the lateral directions of the vehicle 100, with "occupant's side" and the like referring to the left side of the vehicle 100, and "passenger side" and the like referring to the right side of the vehicle 100.

The vehicle 100 includes an exterior and a number of interior compartments. The compartments include a passenger compartment, and an engine compartment. Among other things, the vehicle 100 may include seats, a dash assembly, an instrument panel, controls, and the like housed in the passenger compartment. Additionally, the vehicle 100 may include an engine, a motor, a transmission, and the like, as well as other powertrain components, such as wheels, housed in the engine compartment and elsewhere in the vehicle 100. The wheels support the remainder of the vehicle 100 on the ground. One, some or all of the wheels are powered by the remainder of the powertrain components to drive the vehicle 100 along the ground. The vehicle 100 also includes one or more doors, for example, front doors 102, rear doors 104, a trunk 106, and, in other examples, a liftgate, a tailgate, etc.

The vehicle 100 includes one or more vehicle systems 108 operable to perform vehicle functions. In addition to the vehicle systems 108, the vehicle 100 includes a sensor system 114, as well as one or more processors 124, a memory 126, and a control module 128 to which the vehicle systems 108 and the sensor system 114 are communicatively connected. The sensor system 114 is operable to detect information about the vehicle 100. The processors 124, the memory 126, and the control module 128 together serve as one or more computing devices 122 whose control module 128 is employable to orchestrate the operation of the vehicle 100, in whole or in part. Specifically, the control module 128 operates the vehicle systems 108 based on information about the vehicle 100. Accordingly, as a prerequisite to operating the vehicle systems 108, the control module 128 gathers information about the vehicle 100, including the information about the vehicle 100 detected by the sensor system 114. The control module 128 then evaluates the information about the vehicle 100 and operates the vehicle systems 108 based on its evaluation.

The vehicle systems 108 are part of, mounted to, or otherwise supported by the body. The vehicle systems 108 may be housed, in whole or in part, in any combination of the passenger compartment, the engine compartment, or elsewhere in the vehicle 100. Each vehicle system 108 includes one or more vehicle elements. On behalf of the vehicle system 108 to which it belongs, each vehicle element is operable to perform, in whole or in part, any combination of vehicle functions with which the vehicle system 108 is associated. It will be understood that the vehicle elements, as well as the vehicle system 108 to which they belong, may but need not be mutually distinct. The vehicle systems 108 include an energy system 110 and a propulsion system 112. The energy system 110 and the propulsion system 112 are connected to one another. Moreover, the drivetrain is mechanically connected to the propulsion system 112. The propulsion system 112 and the drivetrain together serve as a powertrain for the vehicle 100. The energy system 110 is operable to perform one or more energy functions, including but not limited to storing and otherwise handling energy. The propulsion system 112 is operable to perform one or more propulsion functions using energy from the energy system 110, including but not limited to powering the wheels.

As a part of the sensor system 114, the vehicle 100 includes one or more vehicle sensors 116 and one or more environment sensors 118. The vehicle sensor(s) 116 monitor the vehicle 100 in real-time. The vehicle sensor(s) 116, on behalf of the sensor system 114, are operable to detect information about the vehicle 100, including information about user requests and information about the operation of the vehicle 100, for example, the vehicle sensor(s) 116 can be configured to detect and/or acquire data about various operating parameters of the vehicle 100. For example, the vehicle sensor(s) 116 can include one or more speedometers, one or more gyroscopes, one or more accelerometers, one or more inertial measurement units (IMUs), one or more wheel sensors, one or more steering angle sensors, one or more controller area network (CAN) sensors, and the like. Relatedly, among information about the operation of the vehicle 100, the sensor system 114 is operable to detect the location and motion of the vehicle 100, including its speed, acceleration, orientation, rotation, direction, and the like, the movement of the wheels, the steering angle, and the operational statuses of one, some, or all of the vehicle systems 108.

The environment sensor(s) 118 can be configured to detect, determine, assess, monitor, measure, acquire, and/or sense data or information about the external environment in which the vehicle 100 is located or one or more portions thereof. The environment sensor(s) 118 can include one or more exterior cameras, for example, one or more monocular cameras 120, and one or more exterior sensors, such as LIDAR sensors, RADAR sensors, SONAR sensors, etc. The environment sensor(s) 118 can be located on an exterior of the vehicle 100 or can be located in any other suitable location. Using the environment sensor(s) 118, the vehicle systems 108 can determine information about the external environment of the vehicle 100, for example, the vehicle systems 108 can detect one or more objects in the external environment of the vehicle 100.

The vehicle systems 108 may also include a user interface 130. The user interface 130 may be any device, component, system, element or arrangement or groups thereof that enable information/data to be entered into a machine by a user and that enable information/data to be presented to a user. For example, the user interface 130 can be a touch screen mounted to a center console of the vehicle 100. The user interface 130 could also be a user's mobile phone communicatively connected to the vehicle 100. The user interface 130 can receive an input from an occupant 214, for example, a driver or a passenger of the vehicle 100. Information input to the user interface 130 may be stored by the processor(s) 124 to the memory 126. The user interface 130 can also output information to the user.

The vehicle systems 108, the sensor system 114, the processors 124, the memory 126, and the control module 128 may be leveraged to implement a parking assist system 140. In the vehicle 100, the vehicle systems 108, the sensor system 114, the processors 124, the memory 126, and the control module 128 leveraged to implement the parking assist system 140 may be part of one or more other control systems typical of vehicles or may be dedicated to the parking assist system 140. The parking assist system 140 will be described in further detail below in connection with a parking space 208, a point-of-interest 212, and an occupant 214 of FIG. 2, and a digital twin simulation 300 of FIGS. 3A-3C. As described below, the parking assist system 140 may be configured to detect the parking space 208 and determine if the parking space 208 is suitable for parking the vehicle 100 based on various parking parameters. The parking parameters include one or more vehicle parameters, one or more environmental parameters, one or more occupant parameters, and/or one or more point-of-interest-related (POI-related) parameters.

The vehicle parameters include parameters relating to the envelope of the vehicle 100, for example, the size and shape of the vehicle 100, the number of doors on the vehicle 100, the type of each door, the direction in which each door opens (e.g., for the vehicle 100 of FIG. 1, the front doors 102 and the rear doors 104 open to the side, the trunk 106 opens up, and, in other examples, a liftgate opens up and to the rear, a tailgate opens down and to the rear, etc.), the dimensions of the vehicle 100 with one or more of the doors partially or fully open, and/or the dimensions of the vehicle 100 with all of the doors fully closed. The parking assist system 140 may identify the vehicle parameters in any suitable manner, for example, using information about the vehicle 100 stored in the memory 126.

The environmental parameters include parameters relating to the external environment of the vehicle 100 and/or the environment of the parking space 208, for example, the dimensions of the parking space 208, one or more objects located about the parking space 208 (e.g., located in, near, above, or otherwise about the parking space 208), and/or the location of the object with respect to the parking space 208 (e.g., a shopping cart left in the parking space 208, a curb located near the parking space 208, a tree branch overhanging the parking space 208, etc.). The parking assist system 140 may identify the environmental parameters in any suitable manner, for example, using the environment sensor(s) 118.

The occupant parameters include information about one or more occupants 214 (or other users) of the vehicle 100, for example, an age, size, mobility, etc. of an occupant 214. The parking assist system 140 can identify the occupant parameters in any suitable manner. For example, the parking assist system 140 may determine the occupant parameters using one or more passenger profiles input to the user interface 130 and stored in the memory 126, using the environment sensor(s) 118 to detect occupants located in or near the vehicle 100, or any other suitable method.

The POI-related parameters are parameters relating to the purpose of the occupant 214 for parking in the parking space 208. The POI-related parameters include one or more points-of-interest (POIs) 212 associated with the parking space 208. The POIs 212 can include stores, residences, commercial buildings, office spaces, etc. that the occupant 214 may exit the vehicle 100 to visit or enter the vehicle 100 after visiting. The parking assist system 140 can identify the POIs 212 in any suitable manner, for example, using map and/or GPS data stored in the memory 126, by receiving an input by the occupant 214 to a navigation system (e.g., through the user interface 130), using the environment sensor(s) 118, etc. The POI-related parameters also include one or more objects associated with the POI 212 (POI-related objects). The POI-related objects include objects that the occupant 214 may unload from the vehicle 100 and take to the POI 212 or load into the vehicle 100 after returning from the POI 212. The parking assist system 140 can identify POI-related objects in any suitable manner, for example, using the environment sensor(s) 118 to detect objects located in or near the vehicle 100, using weight sensors located in or otherwise on the vehicle 100, using the processor(s) 124 to predict objects that an occupant 214 may load into the vehicle 100 after visiting a POI 212, etc.

Figure 2:
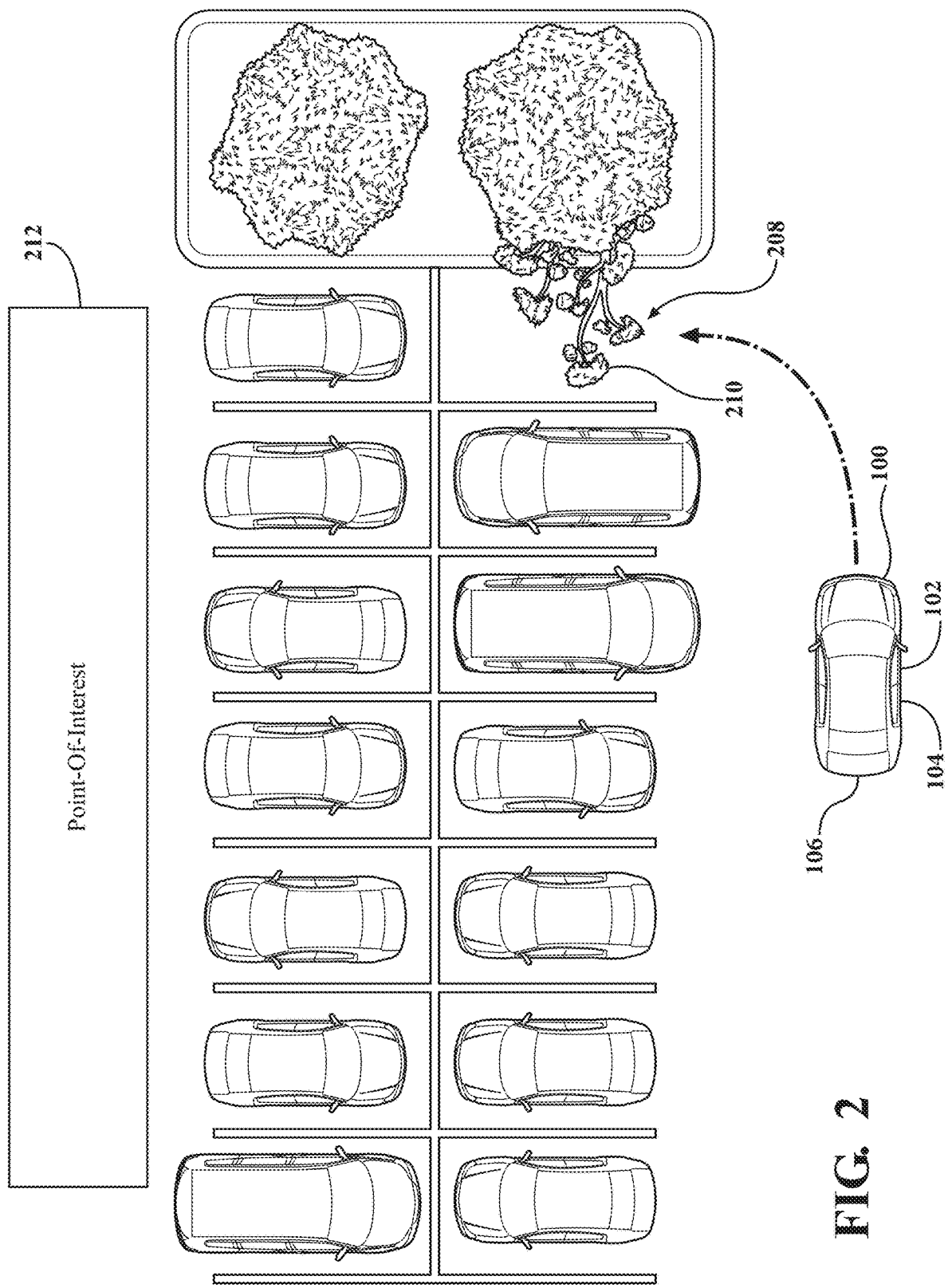
FIG. 2 is an example of a vehicle about to park in an available parking space located in a parking lot associated with a point-of-interest.
Figure 3A:
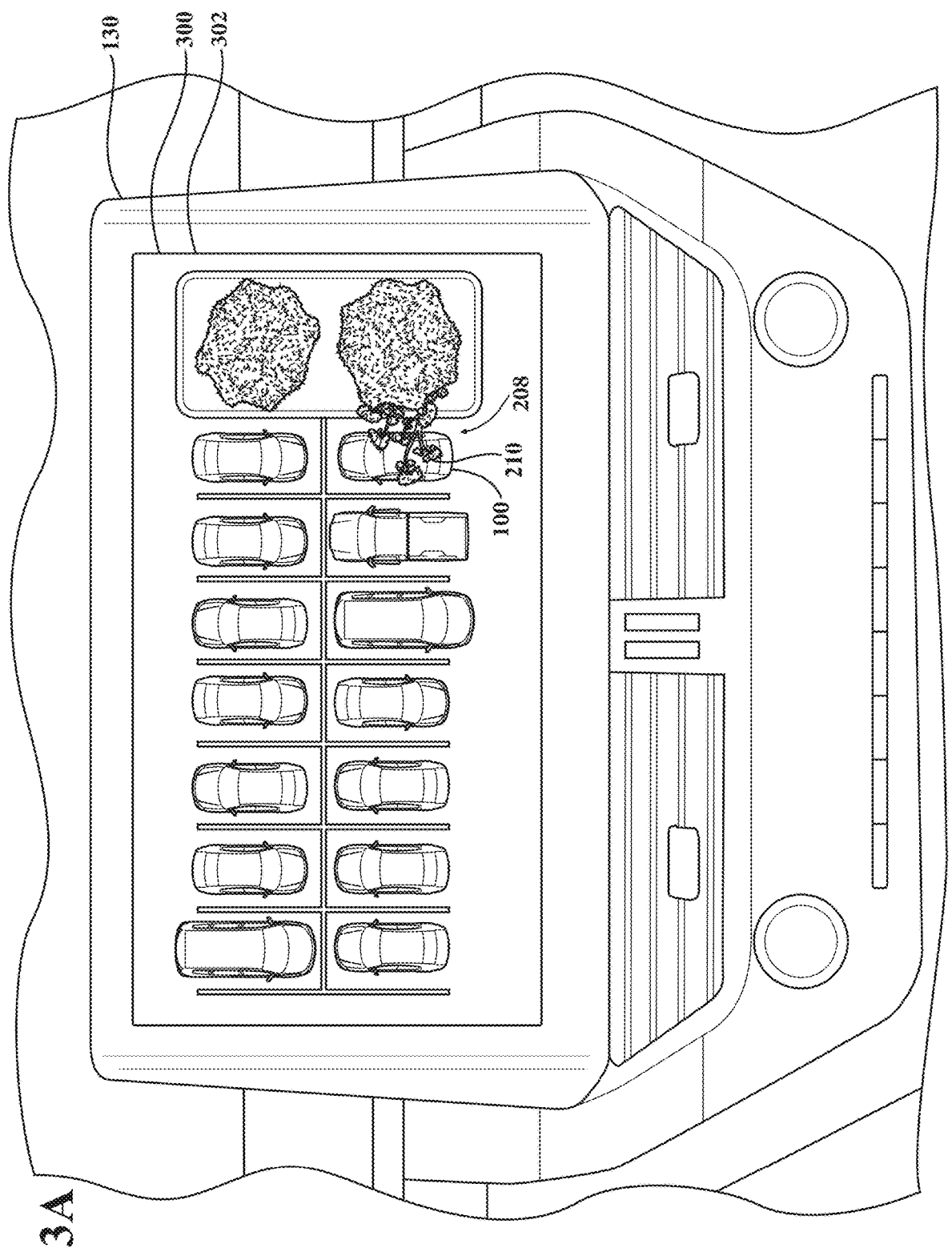
FIG. 3A is a first example of a digital twin simulation of parking the vehicle in the parking space of FIG. 2, where the digital twin simulation is shown on a user interface of the vehicle.
Figure 3B:
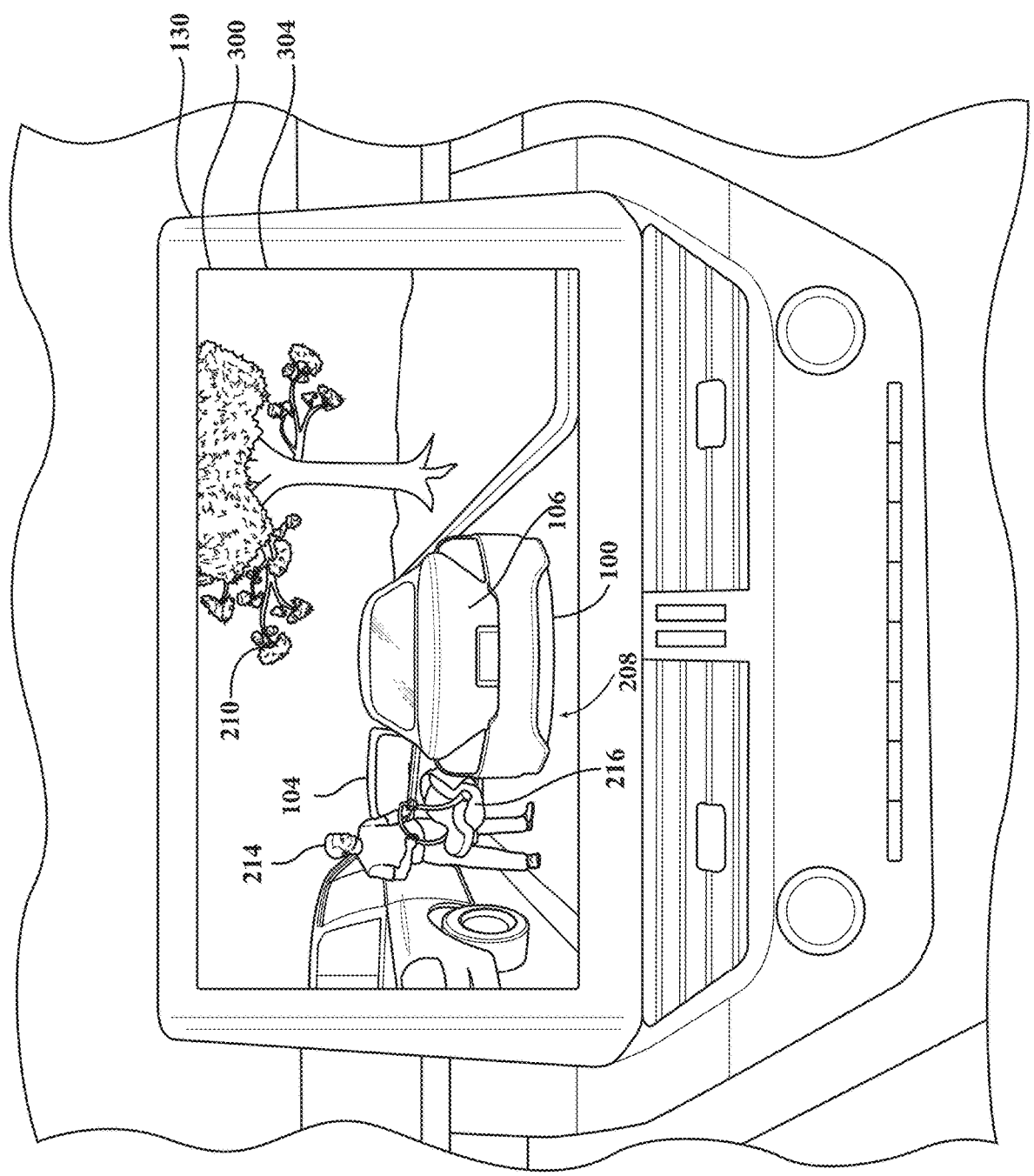
FIG. 3B is a second example of the digital twin simulation of FIG. 3A.
Figure 3C:
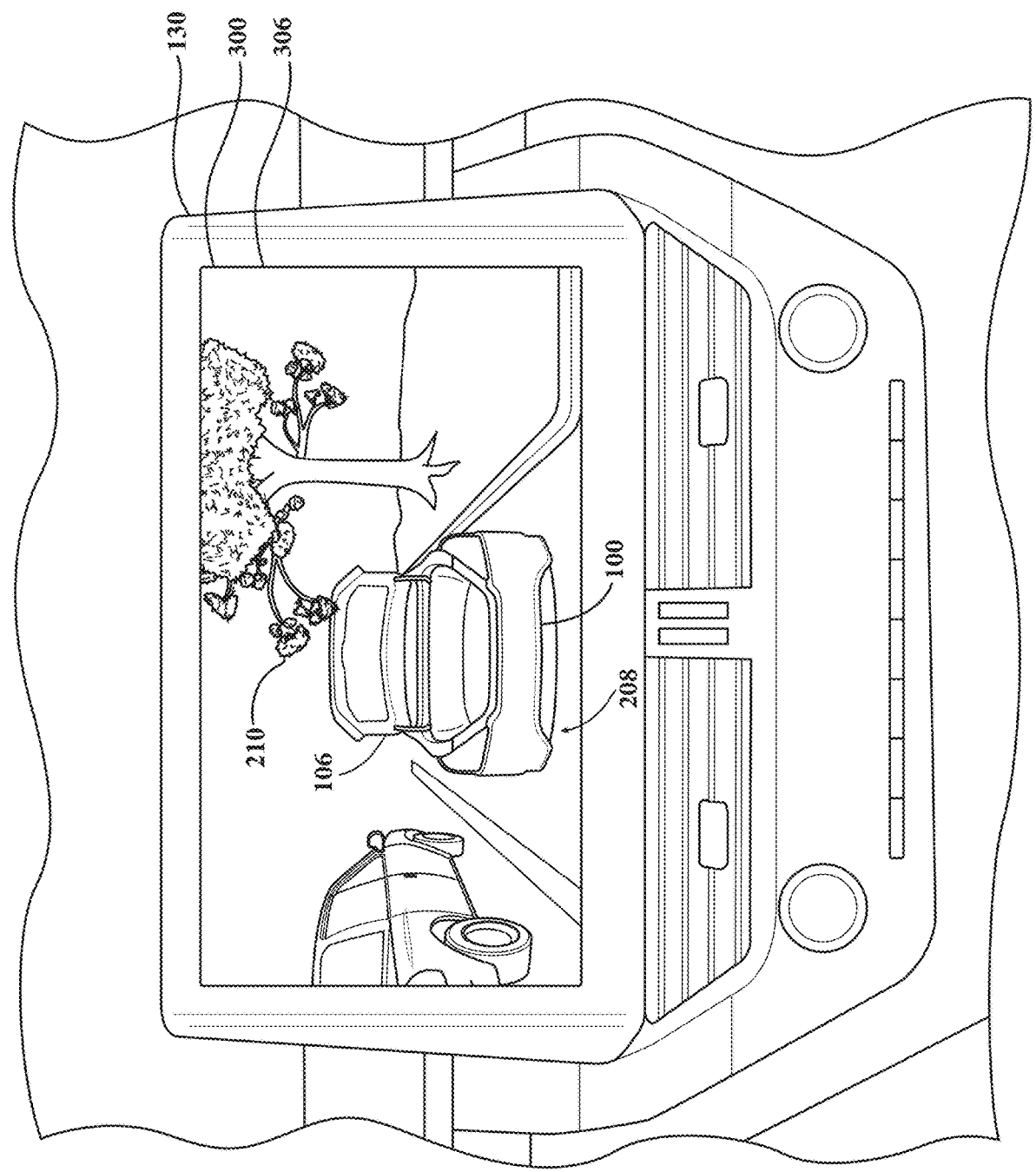
FIG. 3C is a third example of the digital twin simulation of FIG. 3A.

Referring now to FIG. 2, an example of the vehicle 100 parking in a parking space 208 is shown. The occupant 214 may be driving in a parking lot next to a point-of-interest, for example, a hardware store 212. The parking assist system 140 may identify the parking space 208 and determine that a tree branch 210 is overhanging the parking space 208. The parking assist system 140 may also determine that the occupant 214 has a baby carrier 216 in the back seat (FIGS. 3A-3C). Accordingly, the parking assist system 140 can be configured to determine that the POI is the hardware store 212. The POI-related object(s) may be one or more large objects from the hardware store 212, for example, a household appliance or power tools, and one or more objects in the vehicle 100, for example, the baby carrier 216 in the rear seat (FIGS. 3A-3C). The parking assist system 140 can identify that the vehicle parameters include that the vehicle 100 is a sedan with front doors 102 and rear doors 104 that open to the side and a trunk 106 that opens up. The parking assist system 140 can also identify that the environmental parameters include the tree branch 210 overhanging the parking space 208. The parking assist system 140 can also identify that the occupant parameters include that the baby needs adequate room to be loaded into the vehicle 100 in the baby carrier 216.

Based on the above-described parking parameters, the parking assist system 140 can be configured to predict a POI-related action that will occur after the vehicle 100 is parked in the parking space 208. As described above, the POI-related action may be exiting the vehicle 100 to visit a POI 212, entering the vehicle 100 after visiting the POI 212, loading objects from the POI 212 into the vehicle 100, and/or unloading objects from the vehicle 100 to take to the POI 212. The POI-related action prediction may include which occupants 214, if any, will enter or exit the vehicle 100, which objects, if any, will be loaded into or unloaded from the vehicle 100, which doors, if any, will be used, and if so, how far do the doors need to be opened, etc. As shown in FIG. 2, the parking assist system 140 can predict that the POI-related action will include the occupant 214 exiting the vehicle 100, unloading the baby carrier 216 with the baby, visiting the hardware store 212, returning to the vehicle 100 with the baby carrier 216 and an object from the hardware store 212, opening one of the rear doors 104 to load the baby into the rear seat, opening the trunk 106, loading the object into the vehicle 100, and then entering the vehicle 100 through one of the front doors 102.

In another example, if the parking assist system 140 determines that the vehicle 100 is approaching a parking space 208 located in a parking lot associated with a school and that there are children sitting in a rear seat of the vehicle 100, the parking assist system 140 may predict that an occupant 214 of the vehicle 100 will park the vehicle 100 and drop-off the children at the school. In yet another example, if the parking assist system 140 determines that the vehicle 100 is approaching a parking space 208 located in a parking lot associated with a nursing home, and that there is a wheelchair stored in a trunk 106 of the vehicle 100, and a passenger profile indicating that a disabled person is a user of the vehicle 100 is stored in the memory 126, the parking assist system 140 may predict that an occupant 214 of the vehicle 100 will park the vehicle 100, take the wheelchair to the nursing home to pick-up the disabled person, and load the disabled person into the vehicle 100.

Based on the parking parameters and the POI-related action prediction, the parking assist system 140 can be configured to determine whether the parking space 208 is suitable for parking the vehicle 100 or whether the parking space 208 is unsuitable for parking the vehicle 100. "Suitable" may mean that the vehicle 100 will fit in the parking space 208 with room for the occupant 214 to perform a POI-related action, for example, to open the doors for an occupant 214 to exit the vehicle 100 to visit a POI 212, enter the vehicle 100 after visiting the POI 212, load objects from the POI 212 into the vehicle 100, and/or unload objects from the vehicle 100 to take to the POI 212. "Unsuitable" may mean that the vehicle 100 will not fit in the parking space 208 or that the vehicle 100 will fit in the parking space 208 but without enough room for the occupant 214 to perform a POI-related action, for example, to open the doors for an occupant 214 to exit the vehicle 100 to visit a POI 212, enter the vehicle 100 after visiting the POI 212, load objects from the POI 212 into the vehicle 100, and/or unload objects from the vehicle 100 to take to the POI 212.

In order to determine whether the parking space 208 is suitable for parking the vehicle 100, the parking assist system 140 may be configured to run a digital twin simulation 300. As described herein, the digital twin simulation 300 is a real-time, virtual representation of the vehicle 100 parking in the parking space 208. The digital twin simulation 300 may involve digitally parking a simulation of the vehicle 100 into a digital simulation of the parking space 208. Regarding the digital twin simulation 300, the parking assist system 140 assumes that the vehicle 100 will park in the parking space 208. The parking assist system 140 then digitally simulates parking the vehicle 100 into the parking space 208, and then digitally simulates the predicted POI-related action. When the POI-related action is digitally simulated, the parking assist system 140 can be configured to detect one or more parking conflicts based on the parking parameters. A parking conflict can be, for example, not being able to fully fit the vehicle 100 in the parking space 208, not enough room to open one or more of the doors, enough room to open one or more of the doors but not enough room to load or unload a POI-related object or an occupant 214, etc.

The parking assist system 140 can be configured to display the digital twin simulation 300 and/or the results of the digital twin simulation 300 to the occupant 214, for example, using the user interface 130. This may be advantageous to the occupant 214, as the digital twin simulation 300 would inform the occupant 214 whether the parking space 208 is suitable for their purpose and also show the occupant 214 the parking conflicts, if any. Additionally or alternatively, based on the result of the digital twin simulation 300, the parking assist system 140 can be configured to instruct the occupant 214 to park in the parking space 208, autonomously park the vehicle 100 in the parking space 208, instruct the occupant 214 not to park in the parking space 208, or instruct the occupant 214 to find a different parking space 208. For example, if the digital twin simulation 300 finds that the parking space 208 is suitable, the parking assist system 140 can be configured to instruct the occupant 214 to park in the parking space 208 or autonomously park the vehicle 100 in the parking space 208. If the digital twin simulation 300 finds that the parking space 208 is unsuitable, the parking assist system 140 can be configured to instruct the occupant 214 to not park in the parking space 208 and/or instruct the occupant 214 to find a different parking space 208.

Referring now to FIGS. 3A-3C, a first example 302 of the digital twin simulation 300 is shown in FIG. 3A. In FIG. 3A, the digital twin simulation 300 may consider the parameters determined by the parking assist system 140 and may depict the vehicle 100 parked in the parking space 208 under a tree branch 210. Referring now to FIG. 3B, a second example 304 of the digital twin simulation 300 is shown. In FIG. 3B, the digital twin simulation 300 shows the occupant 214 having exited the vehicle 100 and opened one of the rear doors 104 to unload the baby carrier 216 from the rear seat and visit the hardware store 212. In FIG. 3C, a third example 306 of the digital twin simulation 300 is shown. In FIG. 3C, the digital twin simulation 300 shows the trunk 106 opened. As shown in FIG. 3C, the trunk 106 hits the tree branch 210.

Accordingly, the digital twin simulation 300 may find that while there is enough room for the occupant 214 to enter and exit the vehicle 100 and enough room to open one of the rear doors 104 to load and unload the baby carrier 216, there is not enough room to open the trunk 106, because it would hit the tree branch 210, and thus the occupant 214 would not be able to load the large object from the hardware store 212 into the trunk 106. Accordingly, the parking assist system 140 may determine that the parking space 208 is unsuitable for parking the vehicle 100 and can instruct the occupant 214 not to park in the parking space 208 and/or instruct the occupant 214 to find a different parking space 208.

In some instances, the parking assist system 140 may find that the parking space 208 is suitable for parking the vehicle 100. In some instances, however, the occupant 214 may still find that parking the vehicle 100 in the parking space 208 will be difficult. For example, the parking space 208 may be at an angle, or the parking space 208 may have little clearance. In these instances, the parking assist system 140 may be configured to display parking instructions to the occupant 214. The parking instructions may be based on the results of the digital twin simulation 300. Alternatively the parking assist system 140 may autonomously park the vehicle 100 in the parking space 208.

In some arrangements, the parking assist system 140 may detect one or more of the environmental parameters using a depth map generated based on a monocular camera image. Accordingly, referring back to FIG. 1, the vehicle systems 108, the sensor system 114, the processors 124, the memory 126, and the control module 128 may be leveraged to implement a monocular depth estimation (MDE) system 150. In the vehicle 100, the vehicle systems 108, the sensor system 114, the processors 124, the memory 126, and the control module 128 leveraged to implement the MDE system 150 may be part of one or more other control systems typical of vehicles or may be dedicated to the MDE system 150. The MDE system will be described in further detail below in connection with the monocular camera image 400 of FIG. 4A and the depth map 402 of FIG. 4B. The MDE system 150 may be configured to generate a depth map 402 of at least a portion of the external environment of the vehicle 100 based on information received from the sensor system 114. More specifically, the MDE system 150 may be configured to generate a depth map 402 based, at least in part, on information received by one or more monocular cameras 120 mounted to the vehicle 100, for example, based on a monocular camera image 400. The depth map 402 may then be used as an input to other vehicle systems 108, for example, the parking assist system 140, as will be described in further detail below.

Figure 4A:
FIG. 4A is an example of a monocular camera image captured by a monocular camera mounted to a vehicle.

As mentioned above, the vehicle 100 may include one or more monocular cameras 120 mounted to the exterior of the vehicle 100 at the front of the vehicle 100 or at the rear of the vehicle 100, inside the vehicle 100, and/or at any other location on the vehicle 100. The monocular camera(s) 120 are configured to capture one or more monocular camera images of an external environment of the vehicle 100. Referring now to FIG. 4A, an example of a monocular camera image 400 is shown. The monocular camera image 400 shows a view of a preceding vehicle traveling directly ahead of the vehicle 100. The monocular camera image 400 may be a color image typical of other types of vehicle-mounted cameras.

Figure 4B:
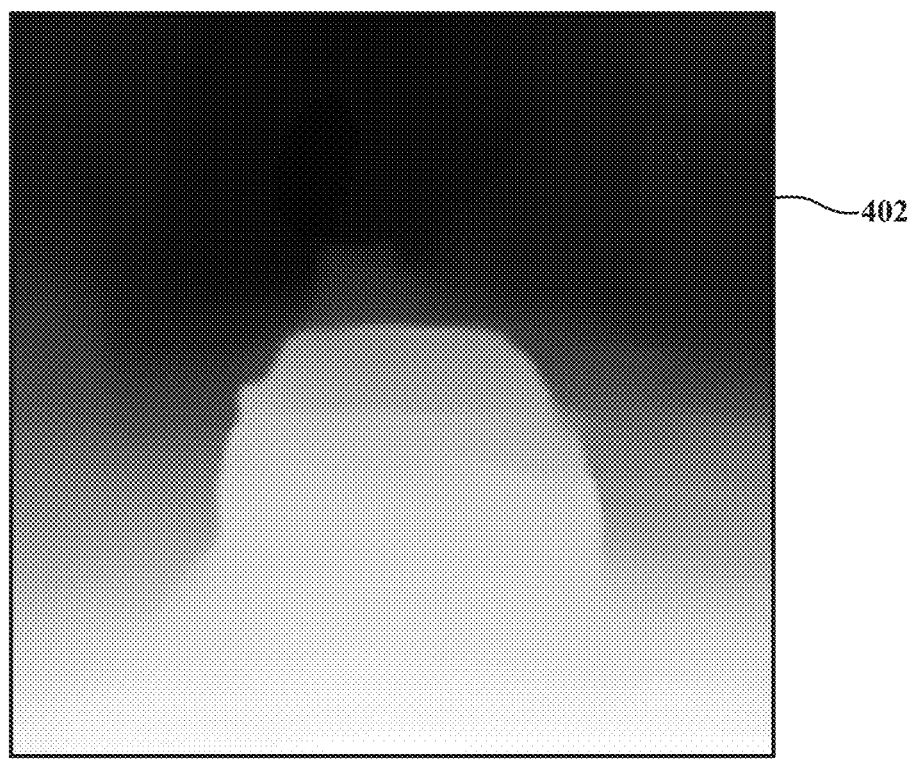
FIG. 4B is an example of a depth map generated based on the monocular camera image of FIG. 4A.

Referring now to FIG. 4B, an example of a depth map 402 is shown. The depth map 402 is a monochrome image based on the monocular camera image 400. The pixel values of the depth map 402 are proportional to the distance between the monocular camera 120 and the object in the monocular camera image 400. As shown, the pixel values of the depth map 402 are proportional to the distance between the monocular camera 120 and the preceding vehicle. The parking assist system 140 may use the depth map 402 to identify the environmental parameters, specifically, the presence of one or more objects about a parking space 208.

Figure 5:
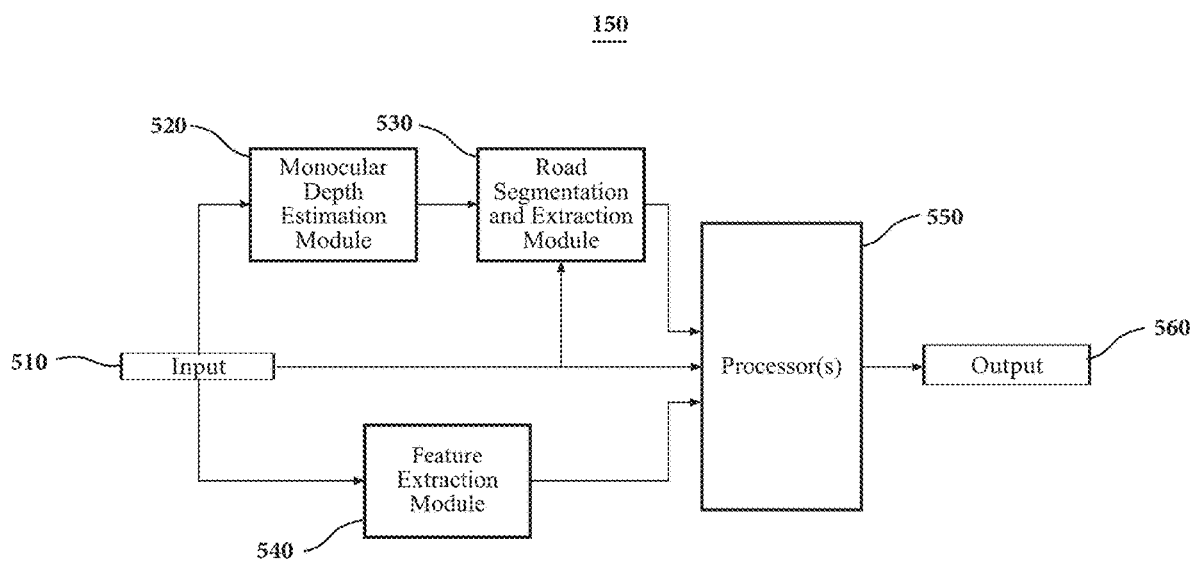
FIG. 5 is an example of a monocular depth estimation system.

Referring now to FIG. 5, the MDE system 150 is shown. The MDE system 150 may be configured to receive an input 510 and generate an output 560. The input 510 may be a monocular camera image, for example, the monocular camera image 400 of FIG. 4A. The monocular camera image 400 can be a color image taken by the monocular camera 120. The output 560 can be the identification of one or more objects, for example, one or more objects in an external environment of the vehicle 100. The MDE system 150 includes a monocular depth estimation (MDE) module 520, a road segmentation and extraction (RSE) module 530, a feature extraction module 540, and one or more processor(s) 550. The processor(s) 550 may be the processor(s) 124 of FIG. 1 or any other suitable processor(s). The MDE module 520, the RSE module 530, and/or the feature extraction module 540 can be a component of the processor(s) 550 or may be a component of one or more other processors. The MDE module 520 is configured to receive the input 510 (i.e., the monocular camera image 400) and generate a depth map 402 using machine learning or any other suitable method. As described above, the depth map 402 is a grayscale image in which each pixel value is proportional to the distance to the monocular camera 120. The RSE module 530 is configured to receive the monocular camera image 400 and/or the depth map 402 and detect, segment out, and extract the part of the monocular camera image 400 and/or the depth map 402 corresponding to the road. The feature extraction module 540 may receive the input 510 and may be configured to detect features (e.g., objects) in the image. The processor(s) 550 may function as a decision system based on the input 510 (i.e., the monocular camera image 400), the depth map 402, the road, and/or the features to generate the output 560. The output 560 may be the detection of one or more objects in the external environment of a vehicle, for example, the vehicle 100 of FIG. 1.

With reference one again to FIG. 1, as noted above, the processors 124, the memory 126, and the control module 128 together serve as the computing device(s) 122 whose control module 128 orchestrates the operation of the vehicle 100, including but not limited to the operation of the vehicle systems 108. The control module 128 may be a dedicated control module for the parking assist system 140. Relatedly, as part of a central control system, the vehicle 100 may include a global control unit (GCU) to which the control module 128 is communicatively connected. Alternatively, the control module 128 may be a global control module. Relatedly, as part of a central control system, the vehicle 100 may include a global control unit (GCU) to which the control module 128 belongs. Although the vehicle 100 as shown includes one control module 128, it will be understood that this disclosure is applicable in principle to otherwise similar vehicles including multiple control modules.

The processors 124 may be any components configured to execute any of the processes described herein or any form of instructions to carry out such processes or cause such processes to be performed. The processors 124 may be implemented with one or more general-purpose or special-purpose processors. Examples of suitable processors include microprocessors, microcontrollers, digital signal processors, or other forms of circuitry that execute software. Other examples of suitable processors include, without limitation, central processing units (CPUs), array processors, vector processors, digital signal processors (DSPs), field programmable gate arrays (FPGAs), programmable logic arrays (PLAs), application specific integrated circuits (ASICs), programmable logic circuitry, or controllers. The processors 124 may include at least one hardware circuit (e.g., an integrated circuit) configured to carry out instructions contained in program code. In arrangements where there are multiple processors, the processors may work independently from each other or in combination with one another.

The memory 126 is a non-transitory computer readable medium. The memory 126 may include volatile or nonvolatile memory, or both. Examples of suitable memory 126 include random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination of these. The memory 126 includes stored instructions in program code. Such instructions are executable by the processors 124 or the control module 128. The memory 126 may be part of the processors 124 or the control module 128 or may be communicatively connected to the processors 124 or the control module 128.

Generally speaking, the control module 128 includes instructions that may be executed by the processors 124. The control module 128 may be implemented as computer readable program code that, when executed by the processors 124, executes one or more of the processes described herein. Such computer readable program code may be stored in the memory 126. The control module 128 may be part of the processors 124 or may be communicatively connected to the processors 124.

Now that the various potential systems, devices, elements, and/or components have been described, various methods, including the possible steps of such methods, will now be described. The methods described may be applicable to the arrangements described above, but it is to be understood that the methods can be carried out with other suitable systems and arrangements. The methods may include other steps not shown here, and the methods are not limited to including every step shown. The blocks illustrated here as part of the methods are not limited to the particular chronological order. Indeed, some of the blocks may be performed in a different order than what is shown and/or at least some of the blocks shown can occur simultaneously.

Figure 6:
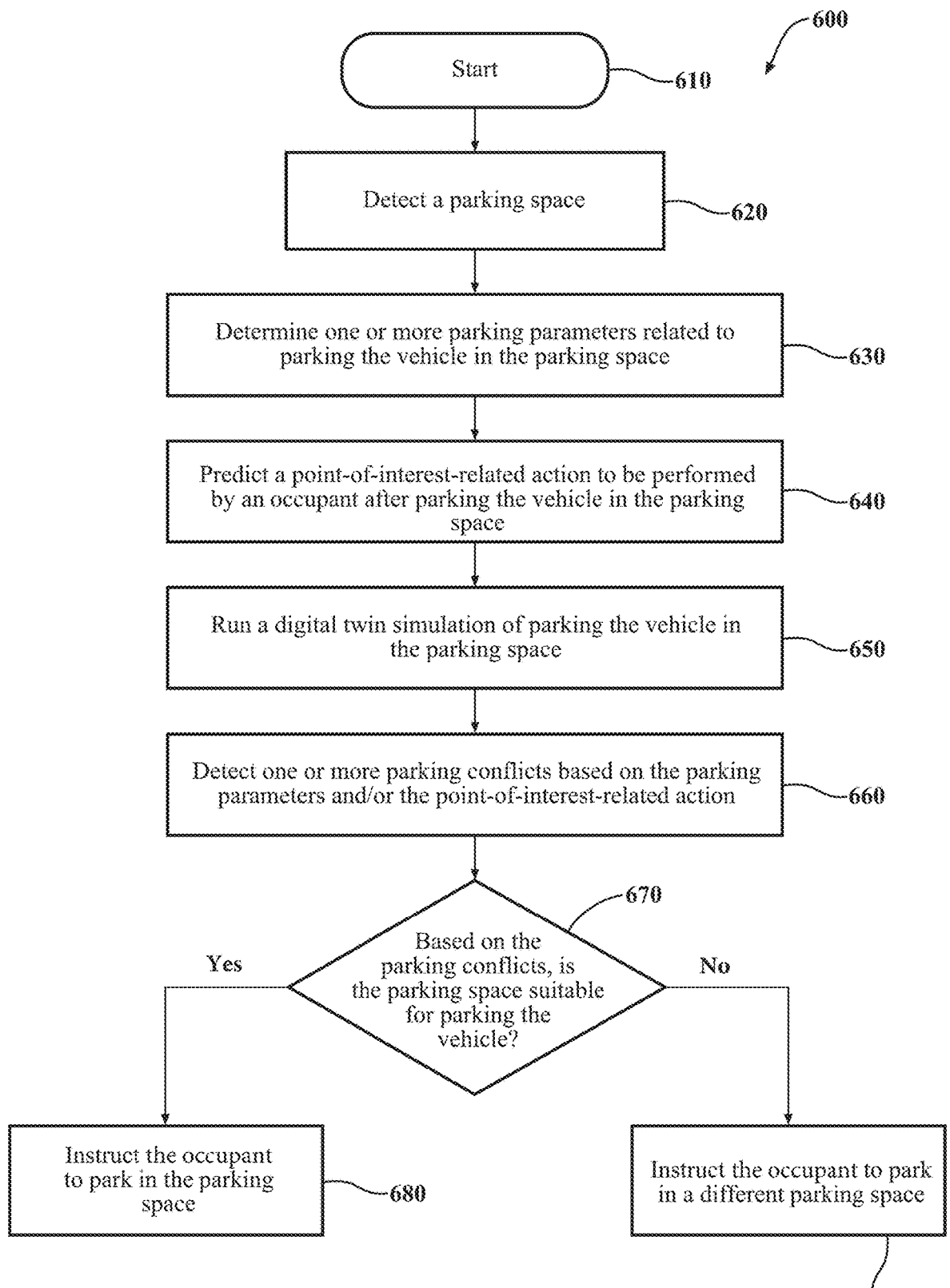
FIG. 6 is an example of a method of operating a parking assist system.

Referring to FIG. 6, an example of a method 600 of operating the parking assist system 140 is shown. The method 600 may begin in operation 610. In operation 620, the method 600 may include detecting a parking space 208. The parking space 208 may be detected by the vehicle 100 using one or more environment sensors 118 located on the vehicle 100. In operation 630, the method 600 may include determining one or more parking parameters related to parking the vehicle 100 in the parking space 208. The parking parameters can include one or more vehicle parameters relating to the envelope of the vehicle 100, one or more environment parameters relating to the environment of the parking space 208, one or more occupant parameters relating to the size, age, and mobility of one or more occupants 214 of the vehicle 100, and/or one or more POI-related parameters, including a point-of-interest associated with the parking space 208 and one or more POI-related objects. In operation 640, the method 600 may include predicting a point-of-interest-related (POI-related) action to be performed by an occupant 214 after parking the vehicle 100 in the parking space 208. The POI-related action may be exiting the vehicle 100 to visit a POI, entering the vehicle 100 after visiting the POI 212, loading objects from the POI 212 into the vehicle 100, and/or unloading objects from the vehicle 100 to take to the POI 212. In operation 650, the method 600 may include running a digital twin simulation 300 of parking the vehicle 100 in the parking space 208. The digital twin simulation 300 may involve digitally simulating the POI-related action. In operation 660, the method 600 may include detecting one or more parking conflicts based on the parking parameters and/or the POI-related action. A parking conflict can be, for example, not being able to fully fit the vehicle 1000 in the parking space 208, not enough room to open one or more of the doors, enough room to open one or more of the doors but not enough room to load or unload a POI-related object or an occupant 214, etc. In operation 670, the method 600 may include determining if the parking space 208 is suitable for parking the vehicle 100, based on the parking conflicts, if any are detected. If the parking space 208 is suitable, the method 600 can proceed to operation 680, in which the method 600 may include instructing the occupant 214 to park in the parking space 208. Alternatively, in operation 680, the method 600 may include autonomously parking the vehicle 100 in the parking space 208. If the parking space 208 is not suitable, the method 600 can proceed to operation 690, in which the method 600 may include instructing the occupant 214 to park in a different parking space 208.

Figure 7:
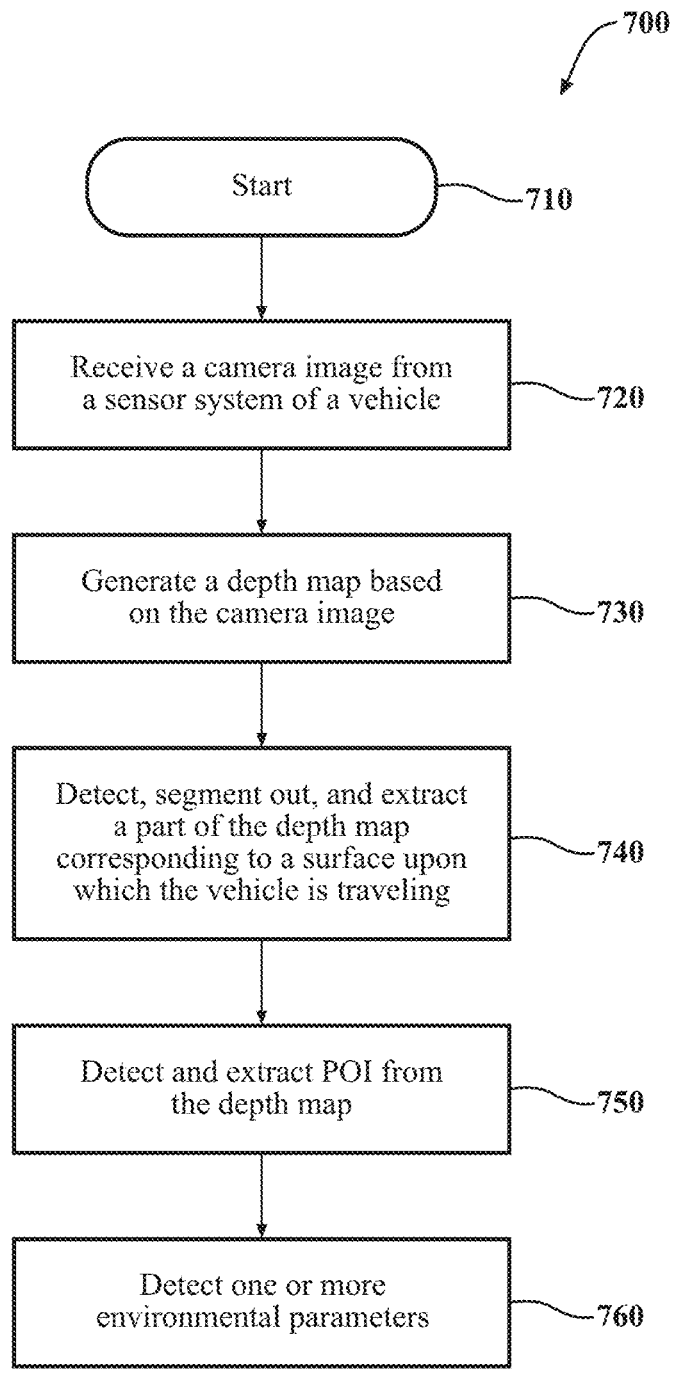
FIG. 7 is an example of a method of generating a depth map.

Referring to FIG. 7, an example of a method 700 of detecting one or more environmental parameters is shown. The method 700 may be used to detect one or more environmental parameters in connection with a parking assist system, for example, the parking assist system 140 of FIG. 1. The method 700 may begin in operation 710. In operation 720, the method 700 may include receiving a monocular camera image 400 from the sensor system 114 of the vehicle 100. In operation 730, the method 700 may include generating a depth map 402 based on the monocular camera image 400. The depth map 402 may be a grayscale image in which each pixel value is proportional to the distance to the monocular camera 120. In operation 740, the method 700 may include, based on the monocular camera image 400 and/or the depth map 402, detecting, segmenting out, and extracting a part of the depth map 402 corresponding to a surface upon which the vehicle 100 is traveling. In operation 750, the method 700 may include, based on the monocular camera image 400 and/or the depth map 402, detecting and extracting points-of-interest (POIs). For example, the method 700 may include detecting one or more objects based on the monocular camera image 400 and/or the depth map 402. In operation 760, the method 700 may include detecting one or more environmental parameters, for example, one or more objects located in an external environment of the vehicle 100 and/or one or more objects located about a parking space 208 detected by the vehicle 100.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A system, comprising:
   a processor; and
   a memory communicably coupled to the processor and storing instructions that when executed by the processor cause the processor to:
      detect a space for parking a vehicle;
      identify a point-of-interest (POI) associated with the space that an occupant of the vehicle is visiting and objects located in the vehicle and the POI;
      predict, based on a type of the POI and a type of objects located in the vehicle and the POI, a group of the objects the occupant will load into the vehicle or unload from the vehicle to take to the POI, the type of POI being at least one of a school, a business, a care facility, and a residential building;
      determine a clearance of a door of the vehicle through which the occupant will load or unload the group of objects to identify a suitability of the space; and
      operate, based on the suitability, an electronic device of the vehicle to generate and output digital information to assist the occupant with parking the vehicle.

2. The system of claim 1, wherein the instructions cause the processor to determine the clearance based on at least one of a type of the vehicle, dimensions of the vehicle, a number of doors on the vehicle, and a direction in which the doors of the vehicle open.

3. The system of claim 1, wherein the instructions cause the processor to determine the clearance based on at least one of dimensions of the space and a presence of one or more objects located about the space.

4. The system of claim 3, wherein the instructions cause the processor to determine the clearance using a depth map generated based on at least one monocular camera image acquired by one or more monocular cameras mounted to the vehicle.

5. The system of claim 1, wherein the instructions to operate the electronic device include instructions to electronically display instructions to park in the space when the space is suitable for parking the vehicle and instructions to find a different space when the space is not suitable for parking the vehicle.

6. The system of claim 1, wherein the instructions to operate the electronic device include instructions to run a digital twin simulation of the loading or unloading of the group of objects, and wherein the instructions further cause the processor to display the digital twin simulation to the occupant.

7. A method, comprising:
   detecting a space for parking a vehicle;
   identifying a point-of-interest (POI) associated with the space that an occupant of the vehicle is visiting and objects located in the vehicle and the POI;
   predict, based on a type of the POI and a type of objects located in the vehicle and the POI, a group of the objects the occupant will load into the vehicle or unload from the vehicle to take to the POI, the type of POI being at least one of a school, a business, a care facility, and a residential building;
   determining a clearance of a door of the vehicle through which the occupant will load or unload the group of objects to identify a suitability of the space; and
   operating, based on the suitability, an electronic device of the vehicle to generate and output digital information to assist the occupant with parking the vehicle.

8. The method of claim 7, wherein determining the clearance includes calculating the clearance based on at least one of a type of the vehicle, dimensions of the vehicle, a number of doors on the vehicle, and a direction in which the doors of the vehicle open.

9. The method of claim 7, wherein determining the clearance includes calculating the clearance based on at least one of dimensions of the space and a presence of one or more objects located about the space.

10. The method of claim 9, wherein determining the clearance includes calculating the clearance using a depth map generated based on at least one monocular camera image acquired by one or more monocular cameras mounted to the vehicle.

11. The method of claim 7, wherein operating the electronic device includes electronically displaying instructions to park in the space when the space is suitable for parking the vehicle and displaying instructions to find a different space when the space is not suitable for parking the vehicle.

12. The method of claim 7, wherein determining the suitability of the space includes running a digital twin simulation of the loading or unloading of the group of objects, and further comprising:
   displaying the digital twin simulation to the occupant.

13. A non-transitory computer-readable medium having instructions that, when executed by a processor, cause the processor to:
   detect a space for parking a vehicle;
   identify a point-of-interest (POI) associated with the space that an occupant of the vehicle is visiting and objects located in the vehicle and the POI;
   predict, based on a type of the POI and a type of objects located in the vehicle and the POI, a group of the objects the occupant will load into the vehicle or unload from the vehicle to take to the POI, the type of POI being at least one of a school, a business, a care facility, and a residential building;
   determine a clearance of a door of the vehicle through which the occupant will load or unload the group of objects to identify a suitability of the space; and
   operate, based on the suitability, an electronic device of the vehicle to generate and output digital information to assist the occupant with parking the vehicle.

14. The non-transitory computer-readable medium of claim 13, wherein the instructions cause the processor to determine the clearance based on at least one of a type of the vehicle, dimensions of the vehicle, a number of doors on the vehicle, and a direction in which the doors of the vehicle open.

15. The non-transitory computer-readable medium of claim 13, wherein the instructions cause the processor to determine the clearance based on at least one of dimensions of the space and a presence of one or more objects located about the space.

16. The non-transitory computer-readable medium of claim 15, wherein the instructions cause the processor to determine the clearance using a depth map generated based on at least one monocular camera image acquired by one or more monocular cameras mounted to the vehicle.

17. The non-transitory computer-readable medium of claim 13, wherein the instructions to operate the electronic device include instructions to electronically display instructions to park in the space when the space is suitable for parking the vehicle and instructions to find a different space when the space is not suitable for parking the vehicle.

* * * * *